(12) United States Patent
Shen et al.

(10) Patent No.: US 11,645,954 B2
(45) Date of Patent: May 9, 2023

(54) CURVED DISPLAY SCREEN, CURVED DISPLAY SCREEN SUPPORTING FRAMEWORK AND CURVED DISPLAY SCREEN FORMING METHOD

(71) Applicant: NANJING LOPU TECHNOLOGY CO., LTD., Nanjing (CN)

(72) Inventors: Xiaobing Shen, Nanjing (CN); Bin Zhu, Nanjing (CN); Lili Ji, Nanjing (CN); Fei Shen, Nanjing (CN); Lingling Jiang, Nanjing (CN)

(73) Assignee: NANJING LOPU TECHNOLOGY CO., LTD., Nanjing (CN)

( * ) Notice: Subject to any disclaimer, the term of this patent is extended or adjusted under 35 U.S.C. 154(b) by 83 days.

(21) Appl. No.: 16/916,134

(22) Filed: Jun. 30, 2020

(65) Prior Publication Data

US 2021/0280098 A1   Sep. 9, 2021

Related U.S. Application Data

(63) Continuation of application No. PCT/CN2020/081027, filed on Mar. 25, 2020.

(30) Foreign Application Priority Data

Mar. 6, 2020   (CN) .......................... 202010151983.4

(51) Int. Cl.
G09F 9/302       (2006.01)
H04N 13/388      (2018.01)

(52) U.S. Cl.
CPC ........... *G09F 9/302* (2013.01); *H04N 13/388* (2018.05)

(58) Field of Classification Search
CPC ............ G09F 9/302; G09F 9/301; G09F 9/33; G09G 2300/02; G09G 3/03; H04N 13/388

(Continued)

(56) References Cited

U.S. PATENT DOCUMENTS

2016/0155391 A1* 6/2016 Takesue ............... G09G 3/3413
                                                           345/690

FOREIGN PATENT DOCUMENTS

CN     106448474 A    2/2017
CN     108230923 A    6/2018
(Continued)

OTHER PUBLICATIONS

Machine translation of WO 2019184133 A1 (Year: 2019).*
Machine translation of WO 2019192093 A1 (Year: 2019).*

*Primary Examiner* — Christopher S Kelley
*Assistant Examiner* — Ana Picon-Feliciano
(74) *Attorney, Agent, or Firm* — Bayramoglu Law Offices LLC

(57) ABSTRACT

A curved display screen forming method includes: modeling to obtain a virtual display layer, and segmenting the display layer to obtain a size of a virtual display module; mapping the size of the virtual display module to obtain a size of a materialized display module; reducing edges of the materialized display module, and arranging an adjustment protrusion on each edge of the materialized display module; modeling to obtain a virtual adjustment layer, wherein a virtual plate of the virtual adjustment layer corresponds to the plurality of virtual display modules, obtaining a size of the virtual plate; converting the size of the virtual plate from a curved surface to a plane to obtain a planar size of the materialized plate; and assembling the materialized display module and the materialized plate to form a curved display screen.

8 Claims, 11 Drawing Sheets

(58) Field of Classification Search
USPC .......................... 361/679.02; 348/46, 51, 86
See application file for complete search history.

(56) References Cited

FOREIGN PATENT DOCUMENTS

| | | | |
|---|---|---|---|
| CN | 208189119 U | 12/2018 | |
| CN | 208298481 U | 12/2018 | |
| CN | 110517599 A | 11/2019 | |
| EP | 3474261 A1 | 4/2019 | |
| JP | 3188328 U | 1/2014 | |
| JP | 2019129450 A | 8/2019 | |
| KR | 20200012484 A | 2/2020 | |
| WO | 2019192093 A1 | 10/2019 | |
| WO | 2019192094 A1 | 10/2019 | |
| WO | WO-2019184133 A1 * | 10/2019 | ............... G09F 9/33 |
| WO | WO-2019192093 A1 * | 10/2019 | ............... G09F 9/33 |

* cited by examiner

CURVED DISPLAY SCREEN, CURVED DISPLAY SCREEN SUPPORTING FRAMEWORK AND CURVED DISPLAY SCREEN FORMING METHOD

CROSS REFERENCE TO THE RELATED APPLICATIONS

This application is the continuation application of International Application No. PCT/CN2020/081027, filed on Mar. 25, 2020, which is based upon and claims priority to Chinese Patent Application No. 202010151983.4, filed on Mar. 6, 2020, the entire contents of which are incorporated herein by reference.

TECHNICAL FIELD

The present invention relates to the field of light-emitting diode (LED) display screen, and more particularly to a curved display screen, a curved display screen supporting framework and a curved display screen forming method.

BACKGROUND

With the continuous progress in development of LED industry, the market demand for large curved LED display screens is increasing. At present, however, the large curved LED display screens on the market mostly are assembled by equal-sized LED modules, which poses poor surface flatness, large gaps and other problems after assembling, thereby resulting in a poor display effect. In the prior art, a method for forming a large curved LED screen is proposed, which includes the following steps: (1) forming a screen model; (2) defining the plane of the circular cross-section with the diameter D as the equatorial plane, and averagely and symmetrically segmenting a cambered surface of the large spherical LED screen model into a plurality of LED screen module strips of equal height in the up and down direction of the equatorial plane; (3) averagely segmenting the LED screen module strip downwards line by line by using a fixed radian into an even number of equal-sized trapezoidal LED screen modules; when the width of the bottom of the module is less than a certain size, averagely segmenting the LED screen module strip by using 2 times the fixed radian; and obtaining the size and shape of each LED screen module after the LED screen module strip is completely segmented in a similar fashion; (4) according to the size and shape, sequentially numbering, processing and assembling each LED screen module to obtain a complete large curved LED display screen. However, the forming method has the following deficiencies: 1. the curved LED screen module formed by the above method is difficult to process and the cost is high; 2. the accuracy of the curved display screen module is difficult to control, and the radian of the curved display screen module may not exactly match the frame of the curved surface. In addition, the accumulated error during installation finally leads to the serious corrugated impressions of the curved display screen.

SUMMARY

In order to solve the technical problems of difficulty in manufacturing and the poor display effect of curved LED display screens in the prior art, the present invention provides a curved display screen, a curved display screen supporting framework and a curved display screen forming method. The display module of the curved display screen of the present invention is a flat panel, which is easy to manufacture, adjust and install, and has a low cost and a good display effect. The technical solution of the present invention is as follows.

According to the first aspect of the present invention, a curved display screen forming method is provided, including:

modeling to obtain a curved virtual display layer, and averagely virtually segmenting the display layer respectively in a transverse direction and a longitudinal direction to obtain a plurality of virtual display modules; calculating a size of each virtual display module;

mapping the size of the virtual display module onto a size of a materialized display module, and proportionally enlarging or reducing the size of all the virtual display modules to obtain a planar size of the materialized display module;

reducing edges of the materialized display module, and arranging at least two adjustment protrusions on each edge of the materialized display module, wherein an extension distance of the adjustment protrusion is less than half of a reduction length of the edges of the materialized display module;

constructing a virtual adjustment layer, wherein the adjustment layer includes a plurality of virtual panels, each virtual panel corresponds to a plurality of arrayed virtual display modules, and a size of the virtual panel is identical with a size of the plurality of corresponding virtual display modules;

mapping the size of the virtual panel onto a size of a materialized panel, multiplying the size of all virtual panels by a derivation coefficient of converting a curve to a planar line to obtain a planar size of the materialized panel; and assembling and adjusting the materialized display module and the materialized panel to form a complete curved display screen.

Further, the display layer is a spherical screen, a plane of a circular cross-section with a diameter D is defined as an equatorial plane; the display layer is averagely symmetrically segmented into a plurality of display modules with an isosceles trapezoidal cambered surface in the up and down direction of the equatorial plane; the display modules is successively defined as a $1^{st}$ display module with an isosceles trapezoidal cambered surface, a $2^{nd}$ display module with an isosceles trapezoidal cambered surface, ..., and an $n^{th}$ display module with an isosceles trapezoidal cambered surface above or below the equatorial plane; the size of the virtual display module is as follows:

$$a_n = \frac{l_n}{x}, a_{n+1} = \frac{l_{n+1}}{x}, c_n = \frac{l_l}{y},$$

wherein, $a_n$ is an arc length of a lower base of the $n^{th}$ isosceles trapezoidal cambered surface, $a_{n+1}$ is an arc length of an upper base of the $n^{th}$ isosceles trapezoidal cambered surface, $c_n$ is an arc length of two legs of the $n^{th}$ isosceles trapezoidal cambered surface, $l_n$ is a length of a latitude line of the lower base of the $n^{th}$ isosceles trapezoidal cambered surface, $l_{n+1}$ is a length of a latitude line of the upper base of the $n^{th}$ isosceles trapezoidal cambered surface; x is the number of transverse average segmentation of the spherical screen, y is the number of longitudinal average segmentation of the spherical screen, and $l_1$ is a length of a longitude line of the spherical screen.

Further, the display layer is averagely virtually segmented with a fixed angle θ in the transverse direction and a fixed angle λ in the longitudinal direction, respectively.

Further, after the materialized display module is obtained, four edges of the materialized display module are reduced equidistantly, a reduction distance of the edges is s; meanwhile, at least two adjustment protrusions are arranged on each edge of the materialized display module, and an extension distance of the adjustment protrusion is less than s/2.

Further, the virtual panel is an isosceles trapezoidal cambered surface; one virtual panel corresponds to a plurality of display modules of M*N arrays, wherein M is the number of columns and N is the number of rows; the size of the virtual panel is as follows: $A_b=M*a_n$, $A_t=M*a_{n+1}$, $C=N*c_n$, wherein, $A_b$ is an arc length of a lower base of the virtual panel, $A_t$ is an arc length of an upper base of the virtual panel, and C is an arc length of two legs of the virtual panel.

Further, the arc lengths of the lower base, the upper base and the two legs of the virtual panel are multiplied by the derivation coefficient of converting the curve to the planar line to obtain the planar size of the materialized panel; the derivation coefficient is calculated as follows: $\xi=[(D-\beta)/D]*(H/Lh)+t*\alpha$, wherein, D is the diameter of the spherical screen, β is a rate of change of the sphere, H is a height from a center of the spherical screen, Lh is an arc length corresponding to a position of H, t is a thickness of a material of the materialized panel; $\alpha=\Delta L/(L*\Delta T)$, wherein, T is an ambient temperature, L is a median line of an isosceles trapezoidal cambered surface of the materialized panel.

Further, after the planar size of the materialized panel are obtained, planar lines of the lower base, the upper base and the two legs of the materialized panel are converted into concave curves; curvatures of the concave curves are equal to curvatures of the arcs of the lower base, the upper base and the two legs of the virtual panel respectively corresponding to the planar lines.

According to the second aspect of the present invention, a curved display screen includes a display layer and an adjustment layer; wherein, the display layer includes a plurality of display modules; at least two adjustment protrusions are arranged on each edge of the display module, and the protrusions of the two adjacent display modules corresponds to each other; the adjustment layer includes a plurality of panels; each panel corresponds to a plurality of arrayed display modules, and a size of the panel is identical with a size of the plurality of corresponding display modules; each edge of the panel is a concave curve to form a point-to-point contact between the adjacent panels.

Further, a substrate of the display module is a printed circuit board, a plurality of light-emitting pixels are arranged on a light-emitting surface of the printed circuit board, and at least one sound transmission hole penetrating through the printed circuit board is arranged between the adjacent light-emitting pixels.

Further, a back surface of the light-emitting surface of the printed circuit board is configured as a driver surface, and the driver surface is provided with a connector, an integrated circuit and a driver; the driver is electrically connected to the light-emitting pixels through the integrated circuit to drive and control the light-emitting pixels; the driver is electrically connected to a terminal of the connector through the integrated circuit; the terminal of the connector is connected to an image processing unit to transmit a display signal, and is connected to a power supply unit to supply power.

Further, the image processing unit communicates with the display modules through a control unit, and the control unit includes a plurality of control modules; the control modules are configured to send the display data of each region to a corresponding display module to realize region-based control of the display modules.

According to the third aspect of the present invention, a curved display screen supporting framework is provided for supporting the curved display screen described above, including:

a main frame layer, wherein the main frame layer forms a supporting framework; and a double-curved surface frame layer, wherein the double-curved surface frame layer includes a first curved surface layer connected to the supporting framework and a second curved surface layer connected to the first curved surface layer, and the curved display screen is installed on the second curved surface layer.

Further, the first curved surface layer includes a plurality of transverse curved arc rods, and the second curved surface layer includes a plurality of longitudinal curved arc rods; the transverse curved arc rods and the longitudinal curved arc rods are interlaced.

Further, the longitudinal curved arc rod is connected to an inner circumference of the transverse curved arc rod through a first connecting assembly; the first connecting assembly includes a fastening member and a clamping member; the fastening member is fastened on the longitudinal curved arc rod, and the clamping member clamps the transverse curved arc rod and locks the transverse curved arc rod movably on an outer surface of the fastening member.

Further, the double-curved surface frame layer is adjustably supported by the main frame layer, and the main frame layer surrounds an outer circumference of the double-curved surface frame layer; a plurality of supporting members are adjustably arranged on the main frame layer, and an upward acute-angled opening is formed between the supporting member and the main frame layer; the transverse curved arc rod passes through the acute-angled opening to form a horizontal cantilever.

Further, the main frame layer and the double-curved surface frame layer are further connected by a second connecting assembly; the second connecting assembly includes a fixing frame, a screw rod and a hoop clamp; the fixing frame is adjustably fixed on the main frame layer, and the screw rod is adjustably arranged on the fixing frame; the hoop clamp is fixed at an end of the screw rod, and the hoop clamp is configured to clamp the transverse curved arc rod.

Based on the above technical solution, the present invention has the following technical effects.

1. In the curved display screen forming method of the present invention, the size of the virtual display module maps the size of the virtual display module onto the size of the materialized display module, and the sizes of all the virtual display modules are proportionally enlarged or reduced to obtain the planar sizes of the materialized display modules. That is to say, the display module in the practical assembly process has a flat panel structure, which is easy to manufacture the display module with the flat panel structure and control the accuracy of the size of the display module.

2. In order to match the flat panel structure with the frame of the curved surface, in the forming method of the present invention, the edges of the display module of the flat panel structure are reduced, and meanwhile, at least two adjustment protrusions are arranged on each edge of the materialized display module. The extension distance of the adjustment protrusion is less than half of the reduction length of the edge of the materialized display module. The adjustment space for the two adjacent display modules is reserved by contracting the edges of the display module. Moreover, if the machining accuracy is relatively low, the adjustment protrusions arranged on each edge can avoid forming the gap during the splicing process of the display modules. When the display modules are assembled tightly, the adjustment protrusion of the display module with a relatively large size can be trimmed to ensure the splicing accuracy, effectively improve the installation accuracy and eliminate the cumulative error.

3. It can be seen from the above that, in order to facilitate processing, the display module of the present invention is designed as a flat panel structure, and the size of the virtual display module can be directly used as the planar size of the flat panel structure. Then, the edges of the flat panel structure are reduced, and meanwhile the adjustment protrusions are arranged on the edges, which can adjust the installation of the display module. However, there will still be errors in the actual installation, especially, when the display modules are installed onto the whole display layer, the cumulative error may be obvious and still affect the display effect. In order to further improve the installation accuracy and eliminate the cumulative error, in the forming method of the present invention, the installation accuracy of the display module is adjusted by means of the adjustment layer, that is to say, the display module is first installed on the panel rather than being installed directly on the frame of the curved surface. Specifically, the plurality of arrayed display modules are installed on one corresponding panel, which is relatively easy to adjust the installation accuracy of the display modules within the one panel. After that, the installation of the panel is further adjusted, but if the panel also adopts the curved surface structure in the manufacturing process, then it is also difficult to control the machining accuracy thereof. Accordingly, the panel of the present invention also adopts a flat panel structure. The present invention, however, does not directly convert the size of the virtual panel into the size of the materialized panel. Because the area of the panel is relatively large, if the size of the virtual panel is directly converted into the size of the materialized panel, then the error caused will be relatively large in the direct conversion process. Therefore, in the design of the panel of the present invention, the size of the virtual panel is first obtained, and then multiplied by the derivation coefficient of converting the curve to the planar line to obtain the planar size of the materialized panel. The planar size of the materialized panel is the true size of the panel. The size error of the panel obtained by such conversion is relatively small, and the cumulative error will be small accordingly.

4. In the splicing process of the panels, on the one hand, the panels can be adjusted by the double-curved surface framework layer, on the other hand, each edge of the panels is a concave curve so as to avoid the mutual interference of the panels.

Figure 1:
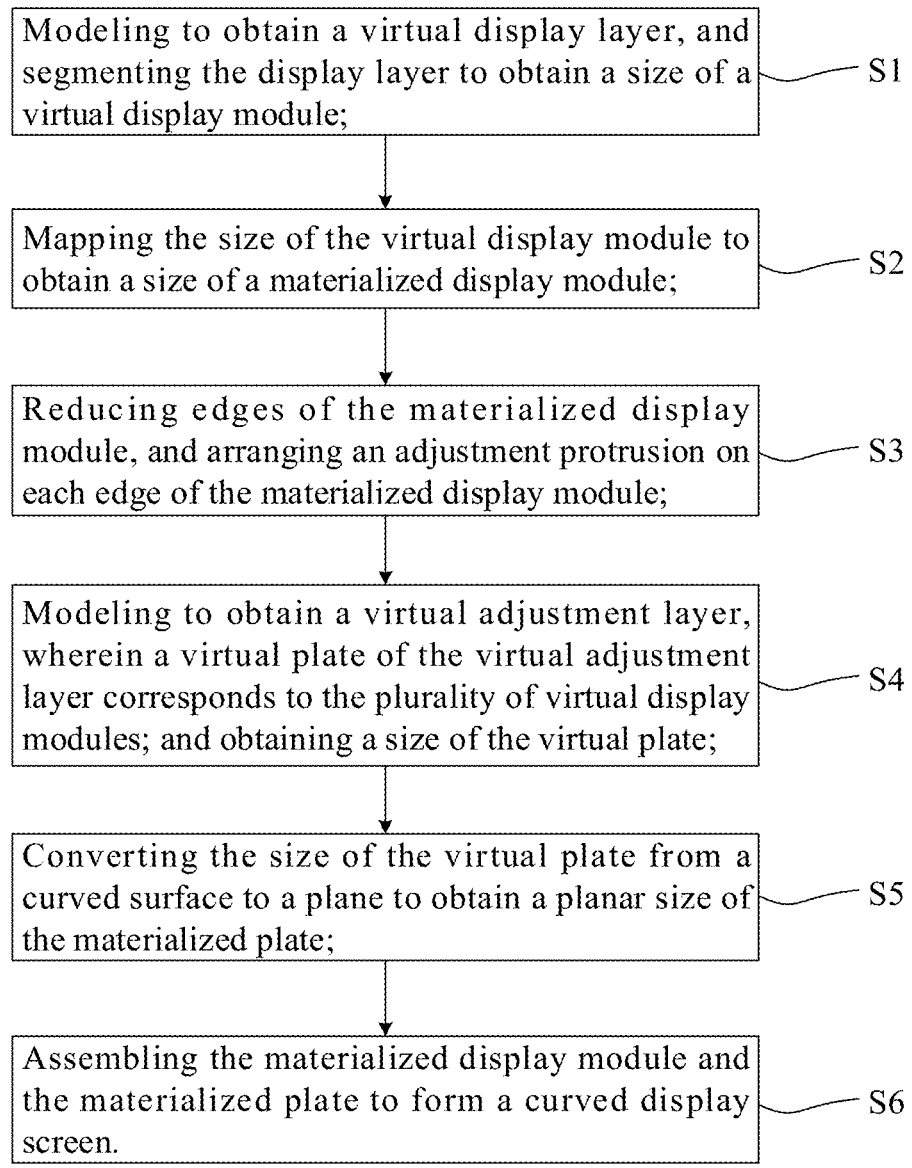
FIG. 1 is a flow chart of the curved display screen forming method according to an embodiment of the present invention.

display screen 1, display layer 11, display module 111, adjustment protrusion 1111, driver 1112, connector 1113, magnetic steel 1114, light-emitting pixel 1115, sound transmission hole 1116, adjustment layer 12, panel 121, square sound transmission hole 1212, concave curve 1211;

double-curved surface frame layer 2, first curved surface layer 21, transverse curved arc rod 211, second curved surface layer 22, longitudinal curved arc rod 221, first connecting assembly 23, fastening member 231, clamping member 232, second connecting assembly 24, fixing frame 241, screw rod 242, hoop clamp 243; and main frame layer 3, and supporting member 31.

DETAILED DESCRIPTION OF THE EMBODIMENTS

The technical solution in the embodiments of the present invention is described clearly and completely in combination with the drawings of the embodiments of the present invention. It is obvious that the described embodiments are only part of the embodiments of the present invention rather than all embodiments. The following description of at least one exemplary embodiment is merely illustrative and in no way acts as any restriction on the present invention and its application or use. Based on the embodiments of the present invention, all other embodiments obtained by those skilled in the art without creative effort fall within the scope of the protection of the present invention.

It should be noted that the terms used herein are only intended to describe the specific embodiments rather than to limit exemplary implementations in accordance with the present invention. Herein, unless otherwise expressly stated in the context, the singular form is also intended to include the plural form. It should also be noted that the term "include/comprise" used in the description indicate the existence of features, steps, operations, devices, components, and/or combinations of them.

Unless otherwise specifically stated, the relative arrangement, numerical expressions and numerical values of the components and steps described in these embodiments do not limit the scope of the present invention. Meanwhile, it should be understood that, for convenience of description, the sizes of the various parts shown in the drawings are not drawn in accordance with the actual proportional relation. Technologies, methods and devices known to those skilled in the art may not be discussed in detail, but where appropriate, such technologies, methods and devices shall be considered as part of the authorized description. In all the embodiments shown and discussed hereinafter, any specific value should be interpreted as merely exemplary, but not as a limitation. Therefore, other examples of exemplary embodiments may have different values. It should be noted that similar labels and letters represent similar items in the drawings attached, so once an item is defined in one of the drawings, it does not need to be discussed further in the subsequent drawings.

In the description of the present invention, it should be understood that the orientations or the position relations indicated by the orientation words, such as "front, back, upper, lower, left, right", "transverse, longitudinal, vertical, horizontal" and "top, bottom", are usually based on the orientations or position relationships shown in the drawings, only for facilitating the description of the present invention and simplify the description. Without explanation to the contrary, these orientation words do not indicate and imply that the device or element referred to must have a specific orientation or be constructed and operated in a specific direction and therefore cannot be understood as a limitation on the scope of protection of the present invention. The orientation words "inner, outer" refer to the inside and outside relative to the outline of each component itself.

For ease of describing the present invention, spatial relative terms, such as "on . . . ", "above . . . ", "on the upper surface of . . . ", "upper" and the like, can be used to describe the spatial relationship between one device or feature and other devices or features, as shown in the drawings. It should be understood that the spatial relative terms are intended to include different orientations in use or operation other than those orientations described by the device in the drawings. For example, if the device in the drawings is inverted, a device described as "a device above other device or structure" will be positioned to "a device under other device or structure". Therefore, the exemplary term "above . . . " may include two orientations, i.e. "above . . . " and "under . . . ". The device can also be positioned in other different ways (being rotated by 90 degrees or in other directions), and the relative description of the space used here is explained accordingly.

In addition, it should be noted that the words, such as "first" and "second", used to define parts and components is only to facilitate distinguishing the corresponding parts, and if not otherwise stated, the above words have no special meaning and cannot be understood as a limitation to the scope of protection of the present invention.

Embodiments

Figure 13:
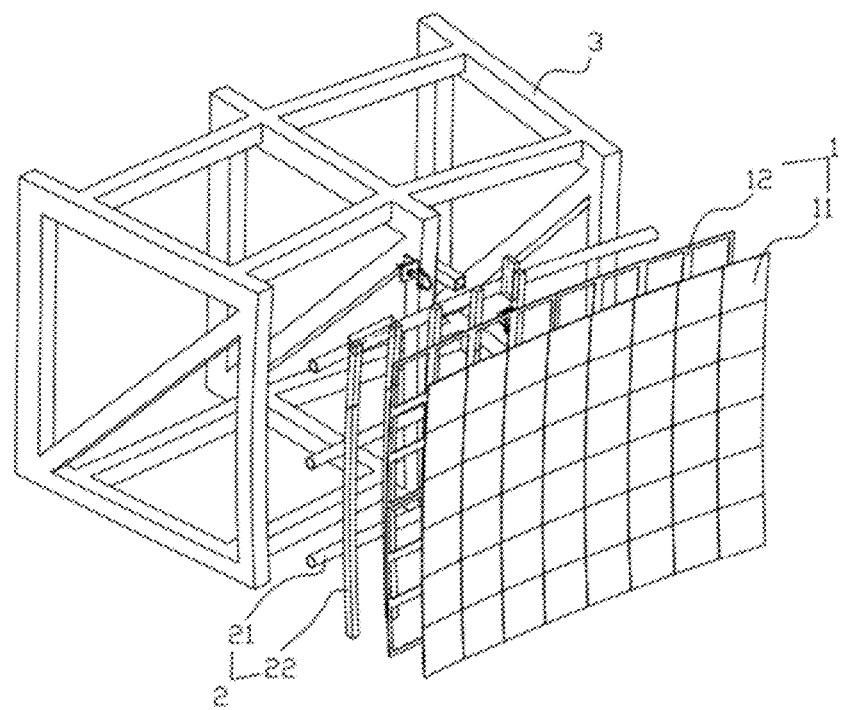
FIG. 13 is a schematic diagram of the structure of a display layer and an adjustment layer according to an embodiment of the present invention.

As shown in FIGS. 1 and 13, the present embodiment provides a curved display screen forming method, including the following steps.

Figure 2:
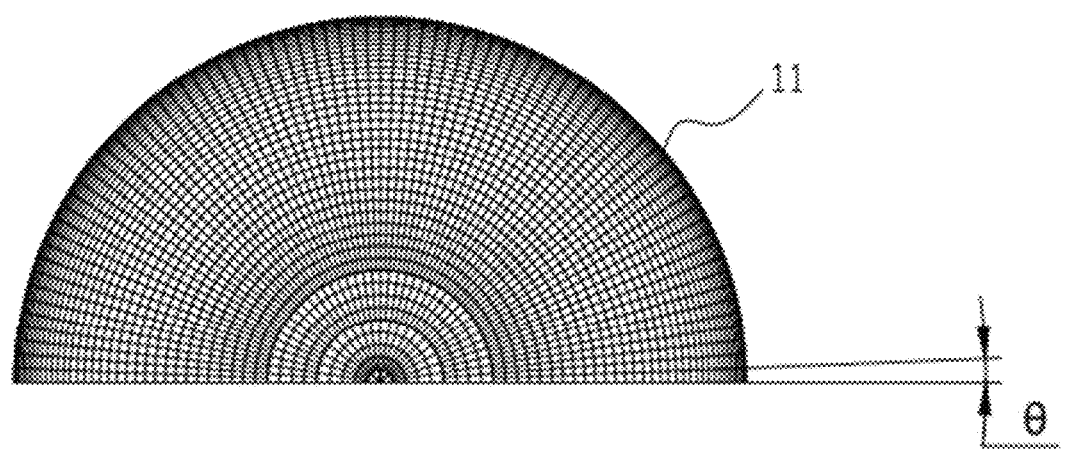
FIG. 2 is a schematic diagram of transverse average segmentation of a display layer according to an embodiment of the present invention.
Figure 3:
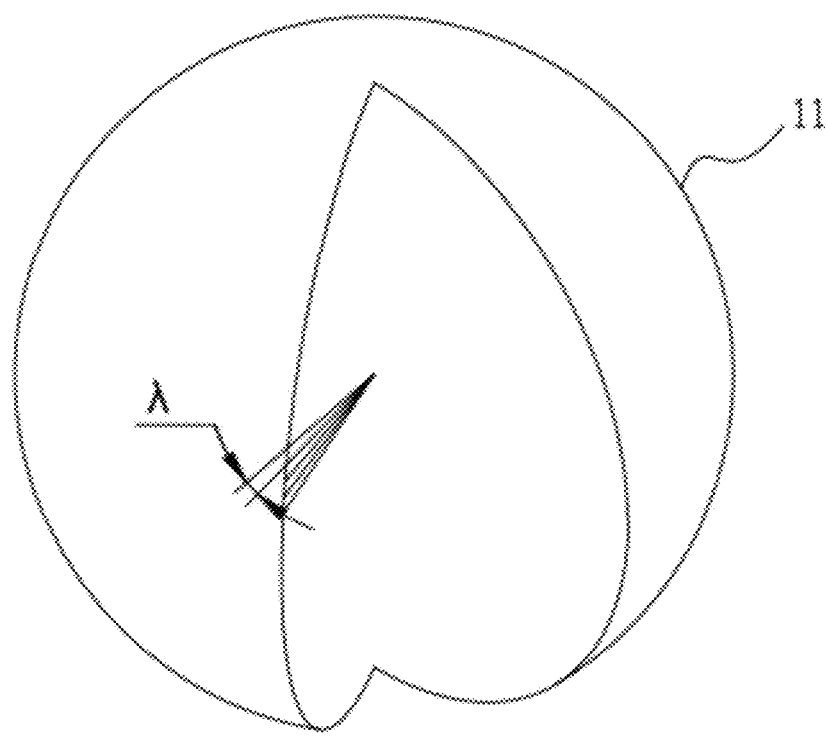
FIG. 3 is a schematic diagram of longitudinal average segmentation of the display layer according to an embodiment of the present invention.

S1: the curved virtual display layer 11 is obtained by the modeling software, and the display layer 11 is averagely virtually segmented in a transverse direction and a longitudinal direction, respectively, to obtain a plurality of virtual display modules 111. As shown in FIGS. 2-3, in the embodiment, the spherical screen-shaped display layer 11 is taken as an example, the display layer 11 is averagely virtually segmented with the fixed angles θ and λ respectively in the transverse direction and the longitudinal direction.

Figure 4:
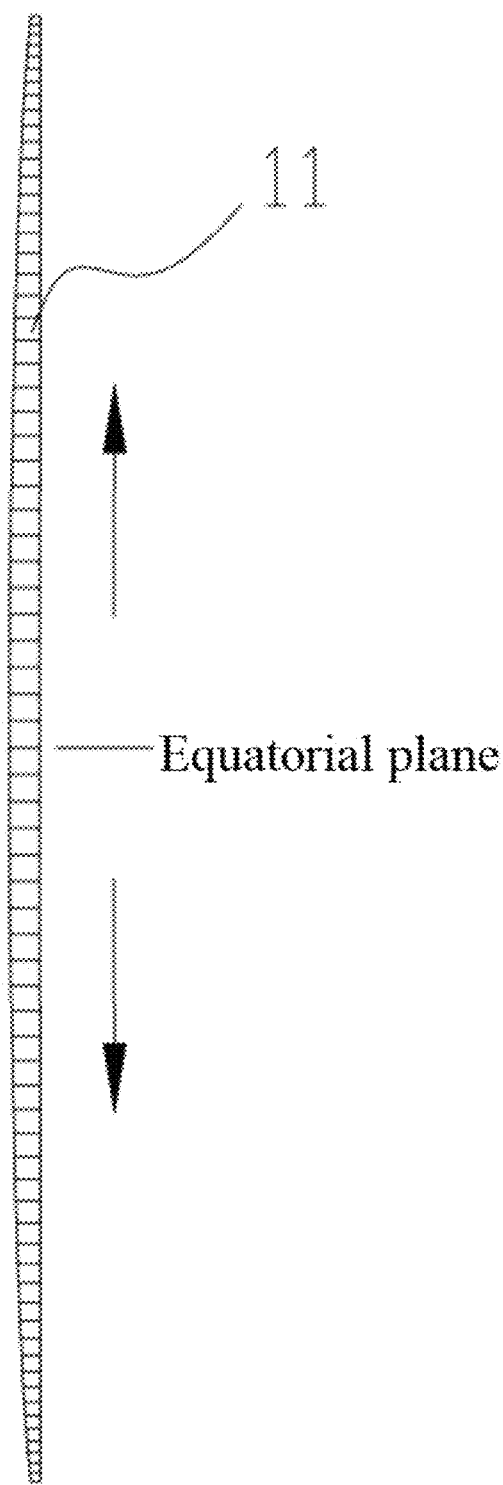
FIG. 4 is a schematic diagram of segmentation of the display layer according to an embodiment of the present invention.

Then the size of each virtual display module 111 is calculated, and the method for calculating the size of the virtual display module 111 is as follows. As shown in FIG. 4, the plane of the circular cross-section with the diameter D is defined as the equatorial plane. The display layer 11 is averagely symmetrically segmented into a plurality of display modules 111 with an isosceles trapezoidal cambered surface in the up and down direction of the equatorial plane. The display modules 111 in each two longitude lines is successively defined as a $1^{st}$ display module with an isosceles trapezoidal cambered surface, a $2^{nd}$ display module with an isosceles trapezoidal cambered surface, . . . , and an $n^{th}$ display module with an isosceles trapezoidal cambered surface above the equatorial plane. The size of the virtual display module 111 is calculated as follows:

$$a_n = \frac{l_n}{x}, a_{n+1} = \frac{l_{n+1}}{x}, c_n = \frac{l_l}{y},$$

wherein, $a_n$ is the arc length of the lower base of the $n^{th}$ isosceles trapezoidal cambered surface, $a_{n+1}$ is the arc length of the upper base of the $n^{th}$ isosceles trapezoidal cambered surface, $c_n$ is the arc length of the two legs of the $n^{th}$ isosceles trapezoidal cambered surface, $l_n$ is the length of the latitude line where the lower base of the $n^{th}$ isosceles trapezoidal cambered surface is located, $l_{n+1}$ is the length of the latitude line where the upper base of the $n^{th}$ isosceles trapezoidal cambered surface is located. x is the number of transverse average segmentation of the spherical screen, y is the number of longitudinal average segmentation of the spherical screen, $l_1$ is the length of the longitude line of the spherical screen.

Through the above method, the sizes of the display modules 111 above the equatorial plane between each two longitude lines can be obtained, and because of the up-down symmetry of the spherical screen, the sizes of the display modules 111 under the equatorial plane can also be obtained. In this way, the sizes of all virtual display modules 111 can be obtained.

Figure 5:
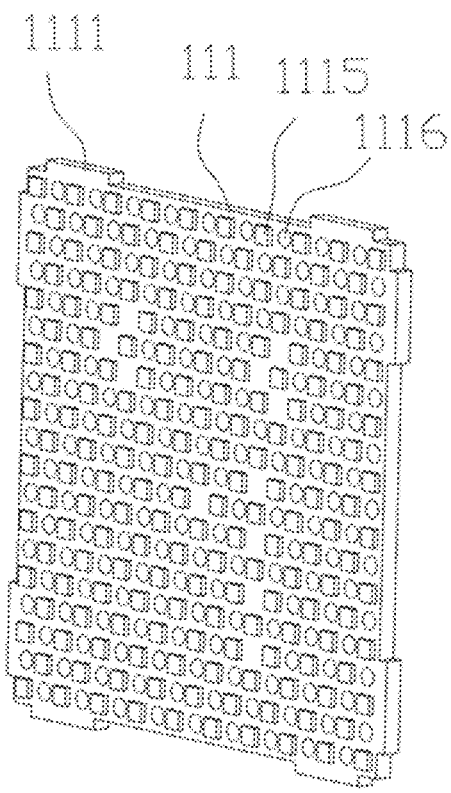
FIG. 5 is a schematic diagram of the structure of a display module according to an embodiment of the present invention.

S2: the size of the virtual display module 111 is mapped onto the size of the materialized display module 111, and the size of all the virtual display modules 111 correspond to the planar size of the materialized display module 111. Specifically, the sizes of all virtual display modules 111 can be proportionally enlarged or reduced to obtain the planar sizes of the materialized display modules 111. Of course, the size of the virtual display module 111 can also be directly used as the planar size of the materialized display module 111. As shown in FIG. 5, the materialized display module 111 is a flat panel, that is to say, the display module 111 in the practical assemble process has a flat panel structure, which is easy to process the display module 111 and control the accuracy of the size of the display module 111.

Figure 6:
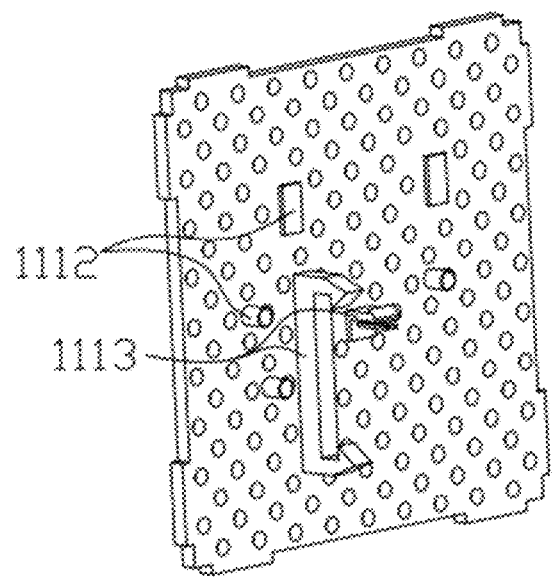
FIG. 6 is a schematic diagram of the back structure of the display module according to an embodiment of the present invention.

S3: in order to facilitate adjusting the display module 111, as shown in FIGS. 5-6, the edges of the materialized display module 111 are reduced, specifically, the four edges of the materialized display module 111 are reduced equidistantly, the reduction distance of the edge is s, the reduction distance of the edge is 0.3 mm-0.4 mm, and preferably the reduction distance of the edge is 0.35 mm. Meanwhile, at least two adjustment protrusions 1111 are arranged on each edge of the materialized display module 111, the extension distance of the adjustment protrusion 1111 is less than half of the reduction length of the edges of the materialized display module 111. Since the edges of the materialized display module 111 are reduced, the adjustment space for the two adjacent display modules 111 is reserved. The adjustment protrusions 1111 on each edge are arranged to avoid forming the gap during the splicing process of the display modules 111 when the machining accuracy is not high. When the display modules are assembled tightly, the adjustment protrusion of the display module 111 with a relatively large size can be processed to ensure the splicing accuracy, effectively improve the installation accuracy and eliminate the cumulative error.

S4: the virtual adjustment layer 12 is constructed, and the adjustment layer 12 includes a plurality of virtual panels 121, each virtual panel corresponds to the plurality of arrayed virtual display modules 111, and the size of the virtual panel 121 is identical with the size of the plurality of corresponding virtual display modules 111.

It can be seen from the above that, in order to facilitate processing, the display module 111 of the present invention is designed as a flat panel structure, and the size of the virtual display module 111 can be directly used as the planar size of the flat panel structure. Then, the edges of the flat panel structure are reduced, and meanwhile the adjustment protrusions 1111 are arranged on the edges. Although the flat panel structure can be adjusted by reducing the edges and arranging the adjustment protrusions 1111, there will still be errors in the actual installation. When the display modules 111 are installed to the whole display layer 11, the cumulative error may be obvious and still affect the display effect. In order to further improve the installation accuracy and eliminate the cumulative error, in the forming method of the present invention, the installation accuracy of the display module 111 is adjusted by means of the adjustment layer 12, that is to say, the display module 111 is first installed on the panel 121 rather than being installed directly on the frame of the curved surface. Specifically, the plurality of arrayed display modules 111 are correspondingly installed on one panel 121, which is relatively easy to adjust the installation accuracy of the display modules 111 within the range of the one panel 121. After that, the installation of the panel 121 is further adjusted. As known that if the panel 121 also adopts the curved surface structure in the manufacturing process, the machining accuracy thereof is uncontrollable, so the panel 121 of the present invention also adopts a flat panel structure. The present invention, however, does not directly convert the size of the virtual panel 121 into the size of the materialized panel 121. Because the area of the panel 121 is relatively large, the size of the virtual panel 121 that is directly converted into the size of the materialized panel 121 will cause the relatively large error in the direct conversion process. Therefore, in the design of the panel 121 of the present invention, the size of the virtual panel 121 is first obtained, and then multiplied by the derivation coefficient of converting the curve to the planar line to obtain the planar size of the materialized panel 121. The planar size of the materialized panel 121 is the true size of the panel 121. The size error of the panel 121 obtained by such conversion is relatively small, and the cumulative error will be small accordingly.

According to one embodiment of the present invention, the virtual panel 121 is also an isosceles trapezoidal cambered surface. One virtual panel 121 corresponds to the display modules 111 of the M*N arrays, wherein M is the number of columns and N is the number of rows. The size of the virtual panel 121 is: $A_b = M*a_n$, $A_t = M*a_{n+1}$, $C = N*c_n$, wherein, $A_b$ is the arc length of the lower base of the virtual panel 121, $A_t$ is the arc length of the upper base of the virtual panel 121, and C is the arc length of the two legs of the virtual panel 121.

Figure 7:
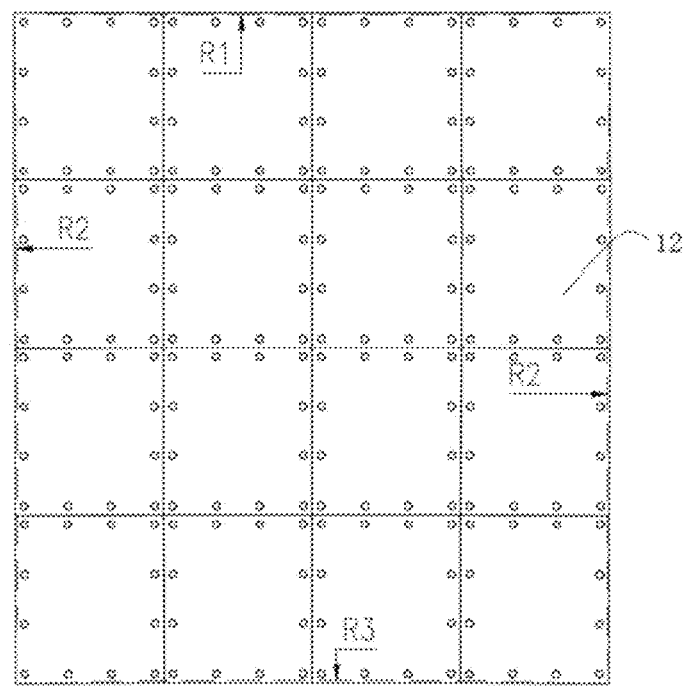
FIG. 7 is a schematic diagram of the structure of a panel according to an embodiment of the present invention.

For example, in the present embodiment, as shown in FIG. 7, one virtual panel 121 corresponds to the display modules 111 of 4*4 arrays, then the size of the virtual panel 121 can be calculated from the sizes of 16 virtual display modules 111.

S5: the size of the virtual panel 121 is mapped onto the size of the materialized panel 121, and the size of all virtual panels 121 is multiplied by the derivation coefficient of converting the curve to the planar line to obtain the planar size of the materialized panel 121.

Figure 8:
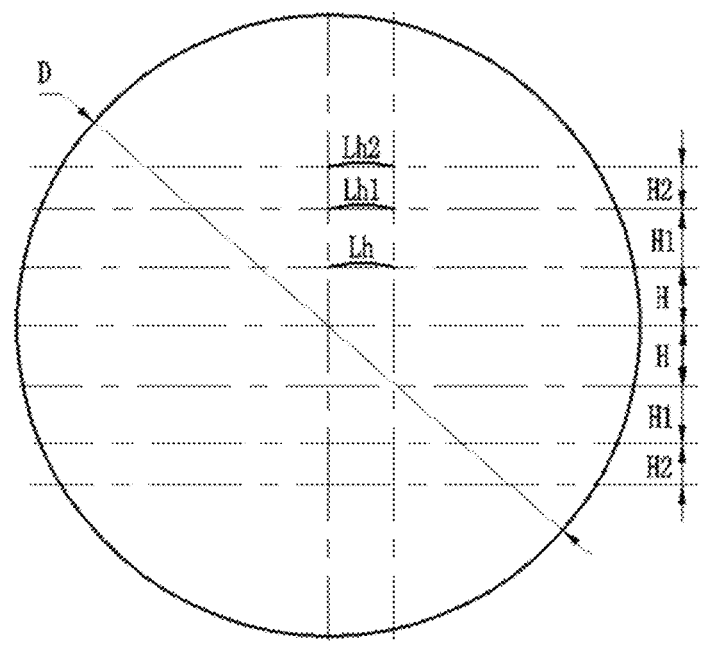
FIG. 8 is a schematic diagram of calculating the derivation coefficient according to an embodiment of the present invention.

According to one embodiment of the present invention, the arc lengths of the lower base, the upper base and the two legs of the virtual panel 121 are multiplied by the derivation coefficient of converting the curve to the planar line to obtain the planar size of the materialized panel 121. As shown in FIG. 8, the derivation coefficient is calculated as follows: $\xi = [(D-\beta)/D]*(H/Lh) + t*\alpha$, wherein, D is the diameter of the spherical screen, $\beta$ is the rate of change of the sphere, H is the height from the center of the spherical screen, Lh is the arc length corresponding the position of H, t is the thickness of the material of the materialized panel; $\alpha = \Delta L/(L*\Delta T)$, wherein, T is an ambient temperature, L is a median line of an isosceles trapezoidal cambered surface of the materialized panel.

Figure 9:
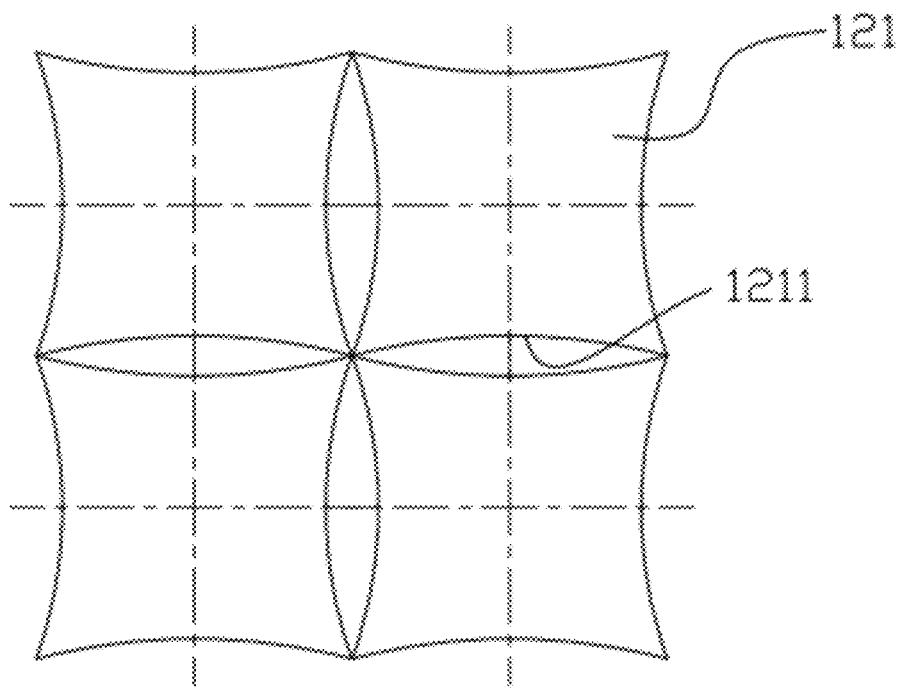
FIG. 9 is a schematic diagram of the structure of a concave curve of the panel according to an embodiment of the present invention.
Figure 10:
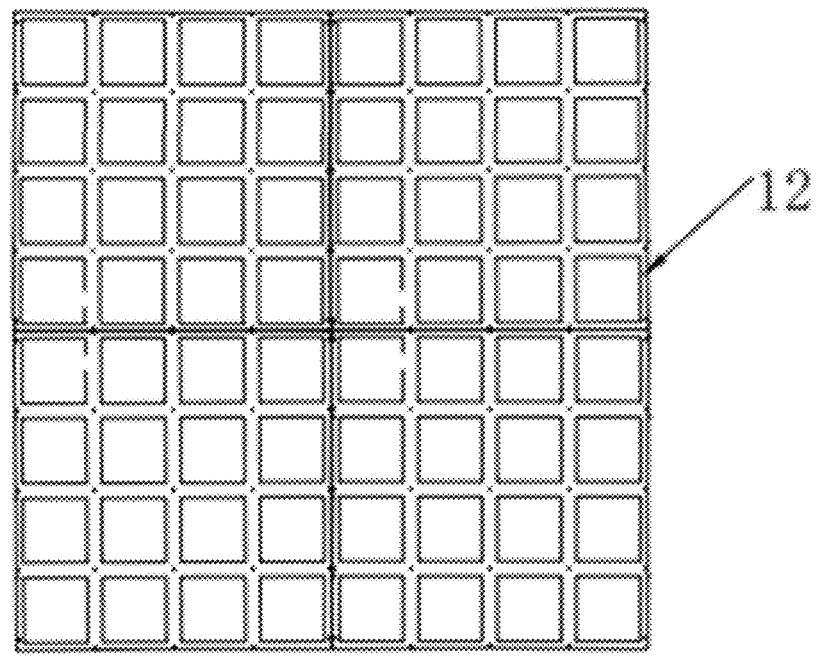
FIG. 10 is a schematic diagram of the assembly structure of the panel according to an embodiment of the present invention.

Further, as shown in FIGS. 7 and 9, after the planar size of the materialized panel (121) are obtained, the planar lines of the lower base, the upper base and the two legs of the materialized panel 121 are converted into concave curves. As shown in FIG. 7, the curvatures (i.e. R1, R2 and R3) of the concave curves of the materialized panel 121 are equal to the curvatures of the arcs of the lower base, the upper base and the two legs of the virtual panel 121 respectively corresponding to the planar lines. In the splicing process of the panels 121, on the one hand, the panels 121 can be adjusted by the double-curved surface framework layer 2, on the other hand, each edge of the panels 121 is provided with a concave curve so as to avoid the mutual interference of the panels 121.

S6: the materialized display module 111 and the materialized panel 121 are assembled and adjusted to form a complete curved display screen.

The display screen 1 formed by the above method has a small accumulative error, a high assembly accuracy, and a good display effect.

According to the present embodiment, a curved display screen includes the display layer 11 and the adjustment layer 12. The display layer 11 includes a plurality of display modules 111. At least two adjustment protrusions 1111 are arranged on each edge of the display module 111, and the protrusions of the two adjacent display modules 111 corresponds to each other. The adjustment layer 12 includes a plurality of panels 121. Each panel 121 corresponds to a plurality of arrayed display modules 111, and the size of the panel 121 is identical with the size of the plurality of corresponding display modules 111. Each edge of the panel 121 has the concave curve 1211. Therefore, during the practical installation, only four points on the edges of the panels 121 need to touch each other in the splicing process, and a gap is reserved between the panels 121. Since the machining accuracy of the panel 121 cannot be guaranteed, the purpose of reserving the gap is to avoid the mutual interference of the panels 121 due to the large machining error.

If the accuracy of the double-curved surface frame layer 2 can meet the requirements, the panel 121 is optional, and the display module 111 is directly attached on the double-curved surface frame layer 2. In fact, it is necessary to adopt the panel 121 due to the following problems. 1. The accuracy of the double-curved surface frame layer 2 is not controllable enough, and the machining accuracy of the panel 121 is much higher than that of the double-curved surface frame layer 2. A space is reserved in the splicing process of the display surface. 2. The double-curved surface frame layer 2 needs to bear load, so it is designed as a steel structure. Due to the cost, the weight and the spatial configuration, the steel structure cannot be densely arranged, which is not suitable to install display module 111. 3. The processing size of the display module 111 is also limited and cannot be too large. Therefore, the panel 121 becomes a bridge connecting the double-curved surface frame layer 2 and the display module 111.

According to one embodiment of the present invention, as shown in FIGS. 5 and 6, the substrate of the display module 111 is a printed circuit board, the printed circuit board is a non-flexible printed circuit board (PCB). The whole curved display screen is formed by splicing a plurality of printed circuit boards with different specifications. A plurality of light-emitting pixels 1115 are arranged on the light-emitting surface of the printed circuit board, the light-emitting pixels 1115 are fixed on the light-emitting surface by welding. The back surface of the light-emitting surface of the printed circuit board is configured as the driver surface, and the driver surface is provided with the connector 1113, the integrated circuit and the driver 1112. The integrated circuit, the connector 1113 and the driver 1112 are fixed on the driver surface by welding. The driver 1112 is electrically connected to the light-emitting pixels 1115 through the integrated circuit to drive and control the light-emitting pixels 1115. The driver 1112 is electrically connected to the terminal of the connector 1113 through the integrated circuit. The connector 1113 is connected to the image processing unit to transmit the display signal, and is connected to the power supply unit to supply power.

According to one embodiment of the present invention, the image processing unit converts a standard video source into a video suitable for playing on the spherical display screen. Meanwhile, the image processing unit can also play the 3D video, so that the immersive spherical display screen has the 3D playing function. In the present embodiment, the curved display screen may be shaped as a complete spherical surface, a complete ellipsoidal surface, a quasi-spherical surface, a quasi-ellipsoidal surface, an cambered surface obtained by arbitrarily cutting a spherical surface or an ellipsoidal surface, or an irregular display surface obtained by splicing a spherical surface or an ellipsoidal surface with a surface of other shape. The display surface can be on the outer surface of the spherical surface or the ellipsoidal surface, or on the inner surface of the spherical surface or the ellipsoidal surface.

According to one embodiment of the present invention, the image processing unit communicates with the display modules 111 through the control unit, and the control unit includes a plurality of control modules. The control modules are mainly configured to send the display data of each region to the corresponding display module 111 to realize the region-based control of the display modules 111.

According to one embodiment of the present invention, the power supply unit includes a plurality of power supply modules, and the power supply modules are mainly configured to provide power for the display module 111.

Figure 11:
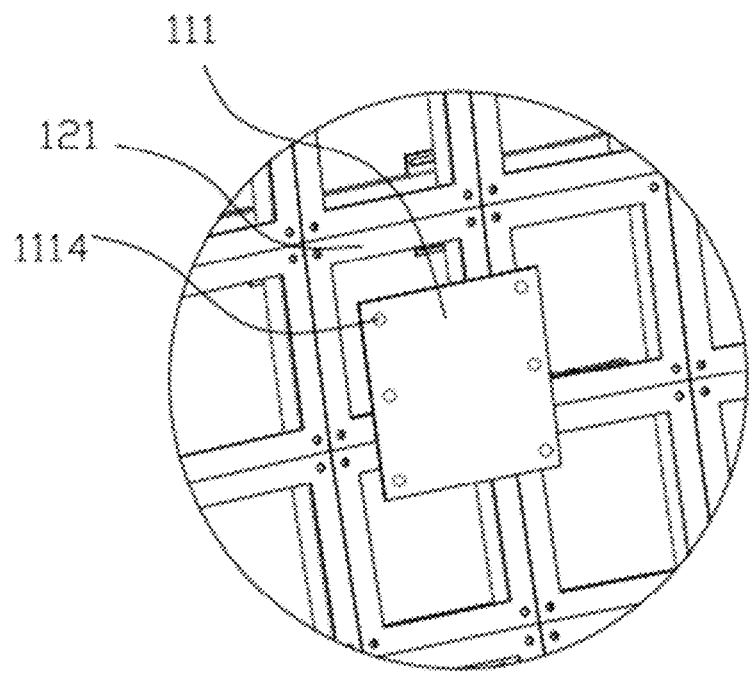
FIG. 11 is a schematic diagram of assembling display modules according to an embodiment of the present invention.
Figure 19:
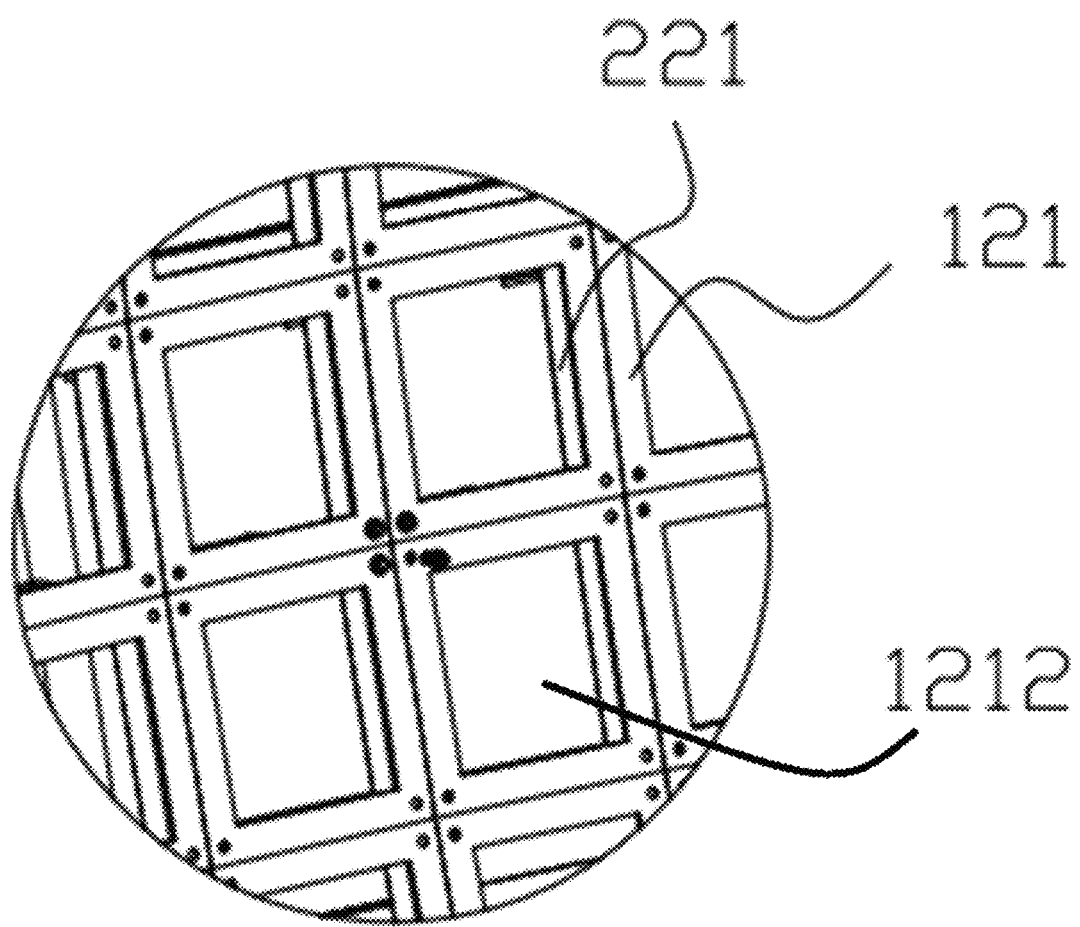
FIG. 19 is a schematic diagram of the installation structure of the adjustment layer according to an embodiment of the present invention.

In order to facilitate the wiring of the display module 111, as shown in FIG. 19, the square sound transmission hole 1212 is formed in the middle of the panels 121, which facilitates the wiring, the heat dissipation and the maintenance on the display module 111. Further, as shown in FIG. 11, for convenience of adjusting the position of the display module 111, the driver surface of the display module 111 is further provided with the magnetic steel 1114, and the display module 111 is connected to the panel 121 through the magnetic steel 1114.

According to one embodiment of the present invention, a plurality of sound transmission holes 1116 are arranged between the light-emitting pixels 1115, and the sound transmission hole 1116 can realize multiple functions such as sound transmission, heat dissipation, reducing the weight of the screen and the like. When the audio device is installed on the back surface of the display screen, the sound is timely transmitted from the sound transmission hole 1116 to the audience, which brings a good visual and auditory feeling to the audience and provides a good sense of immersion. The distance between the sound transmission holes 1116 is not limited and may be equally spaced or unequally spaced. The shape of the sound transmission hole 1116 is not limited and may be any machinable shape such as circle, oval, square, trapezoid and others. The sound transmission hole 1116 must penetrate through the front and back sides of the printed circuit board, and the total area of the sound transmission hole 1116 per unit area can achieve at least 3% of the sound transmittance rate of the LED display screen. Preferably, every four adjacent light-emitting pixels 1115 are arranged in a form of rhombus, square or rectangle. In addition, the number of sound transmission holes 1116 between the adjacent pixels may be single or multiple.

Figure 12:
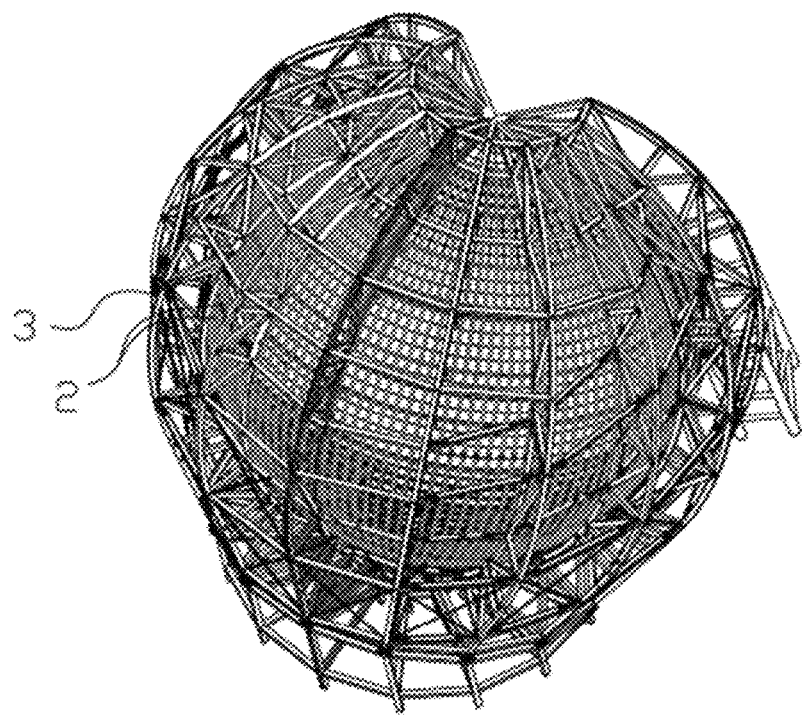
FIG. 12 is a schematic diagram of the structure of a main frame layer according to an embodiment of the present invention.

According to the present embodiment, a curved display screen supporting framework for supporting the curved display screen 1. As shown in FIGS. 12-13. The curved display supporting framework includes the main frame layer 3 and the double-curved surface frame layer 2, wherein the main frame layer 3 is formed as the main frame to play a supporting role. The double-curved surface frame layer 2 includes the first curved surface layer 21 connected to the main frame and the second curved surface layer 22 connected to the first curved surface layer 21.

In the present embodiment, the double-curved surface frame layer 2 can be formed into a sphere, an elliptical sphere, a spherical crown, a rugby-like shape, a football-like shape, a vase-like shape and others. The present invention is not limited to the above implementations, and various changes can also be made without departing from the essence of the present invention.

Figure 14:
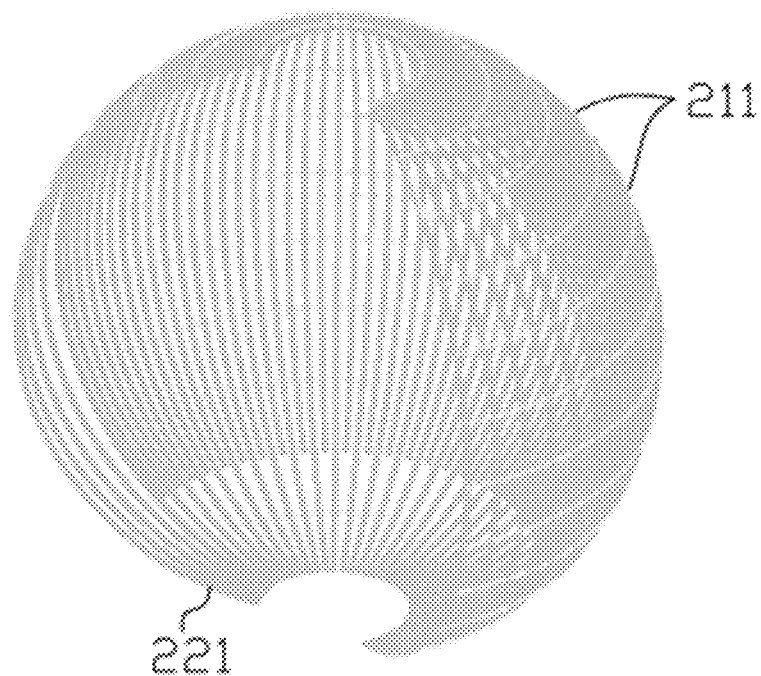
FIG. 14 is a schematic diagram of the structure of the double-curved surface frame layer according to an embodiment of the present invention.

According to one embodiment of the present invention, as shown in FIGS. 12-14, the first curved surface layer 21 includes a plurality of transverse curved arc rods 211, and the second curved surface layer 22 includes a plurality of longitudinal curved arc rods 221. The transverse curved arc rods 211 and the longitudinal curved arc rods 221 are interlaced, and the rods have sections with different shapes, and radians with different curvatures, and may be made of a variety of different materials, which are not limited herein.

Figure 15:
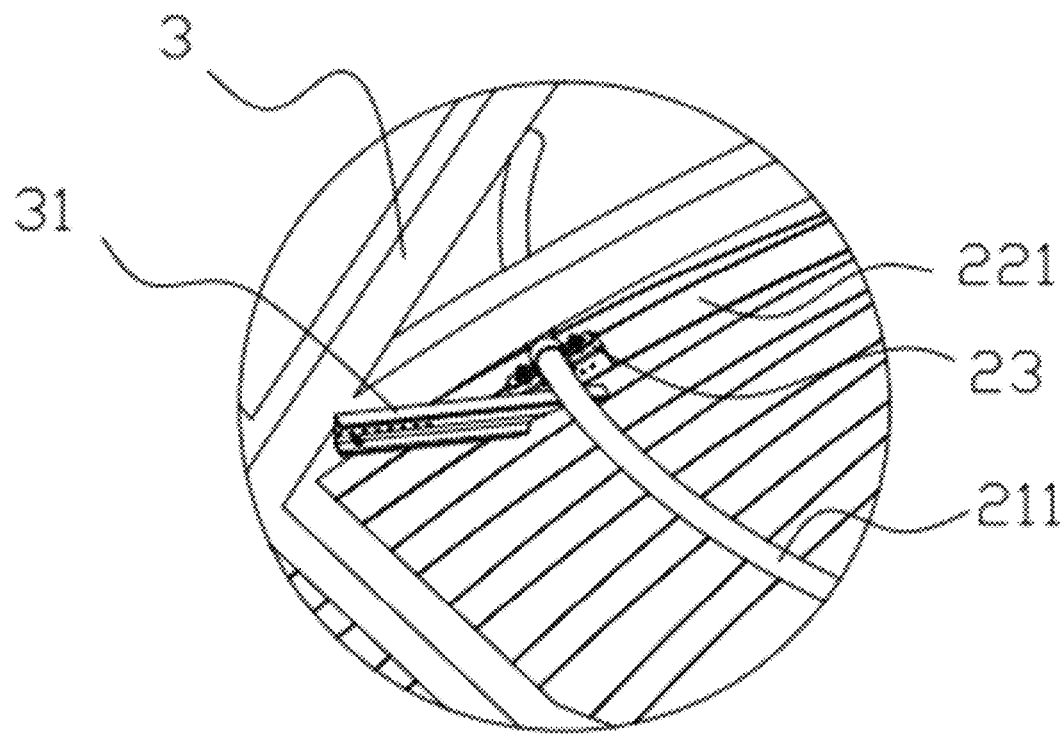
FIG. 15 is a schematic diagram of the structure of a supporting member according to an embodiment of the present invention.
Figure 16:
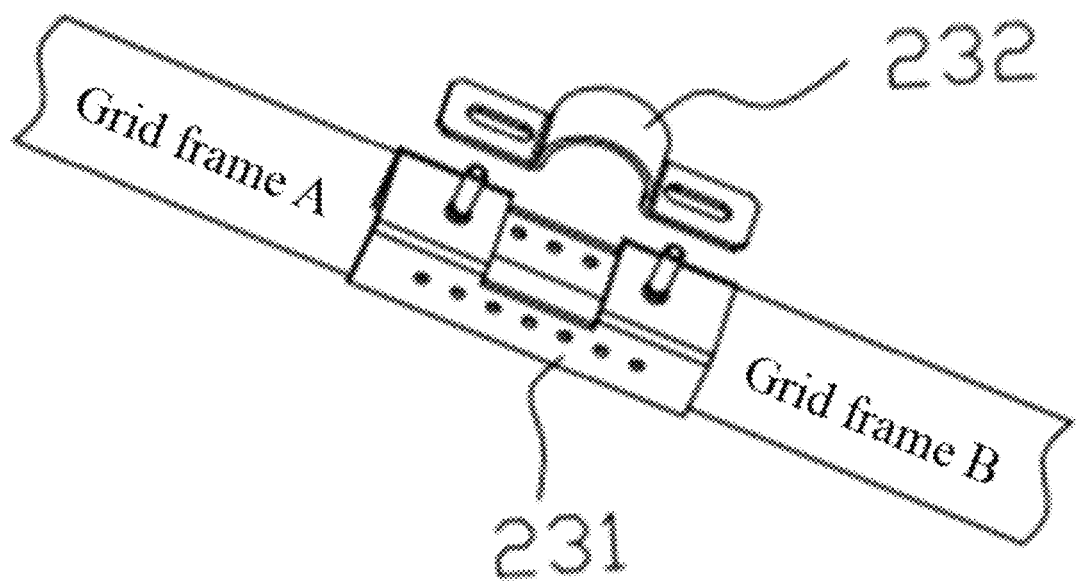
FIG. 16 is a schematic diagram of the structure of the first connecting assembly according to an embodiment of the present invention.

Further, as shown in FIGS. 15 and 16, the longitudinal curved arc rod 221 is connected to the inner circumference of the transverse curved arc rod 211 through the first connecting assembly 23. The first connecting assembly 23 includes the fastening member 231 and the clamping member 232. The fastening member 231 is fastened on the longitudinal curved arc rod 221, and the clamping member 232 clamps the transverse curved arc rod 211 and locks the transverse curved arc rod 211 movably on the outer surface of the fastening member 231. The first connecting assembly 23 can lengthwise connect two segments of the grid frame A and the grid frame B (i.e., the two longitudinal curved arc rods 221) through screws, and the longitudinal curved arc rod 221 is fixed to the transverse curved arc rod 211 through the clamping member 232. In the present embodiment, the fastening member 231 is fastened on the longitudinal curved arc rod 221, and both sides of the fastening member 231 are connected to the longitudinal curved arc rod 221 by screws, which can minimize the installation area occupied by the fastening member 231. The longitudinal curved arc rods 221 close to the crown part of the spherical screen is relatively dense, and the fastening member 231 can save more installation space. In addition, it is convenient to adjust the relative position of the longitudinal curved arc rods 221 through the clamping member 232.

According to one embodiment of the present invention, as shown in FIGS. 12 and 15, the double-curved surface frame layer 2 is adjustably supported by the main frame layer 3, and the main frame layer 3 surrounds the outer circumference of the double-curved surface frame layer 2. The main frame layer 3 is a rack-like structure, that is, the load-bearing body of the whole spherical screen. A plurality of supporting members 31 are adjustably arranged on the main frame layer 3, and the supporting member 31 is fixed to the main frame layer 3 by screws. An upward acute-angled opening is formed between the supporting member 31 and the main frame layer 3. The transverse curved arc rod 211 passes through the acute-angled opening to form a horizontal cantilever. Further, a plurality of holes are arranged in the connection position between the supporting member 31 and the main frame layer 3, and the plurality of holes are configured to adjust the angle of the supporting member 31. Preferably, the supporting member 31 is an angle structural steel.

Figure 17:
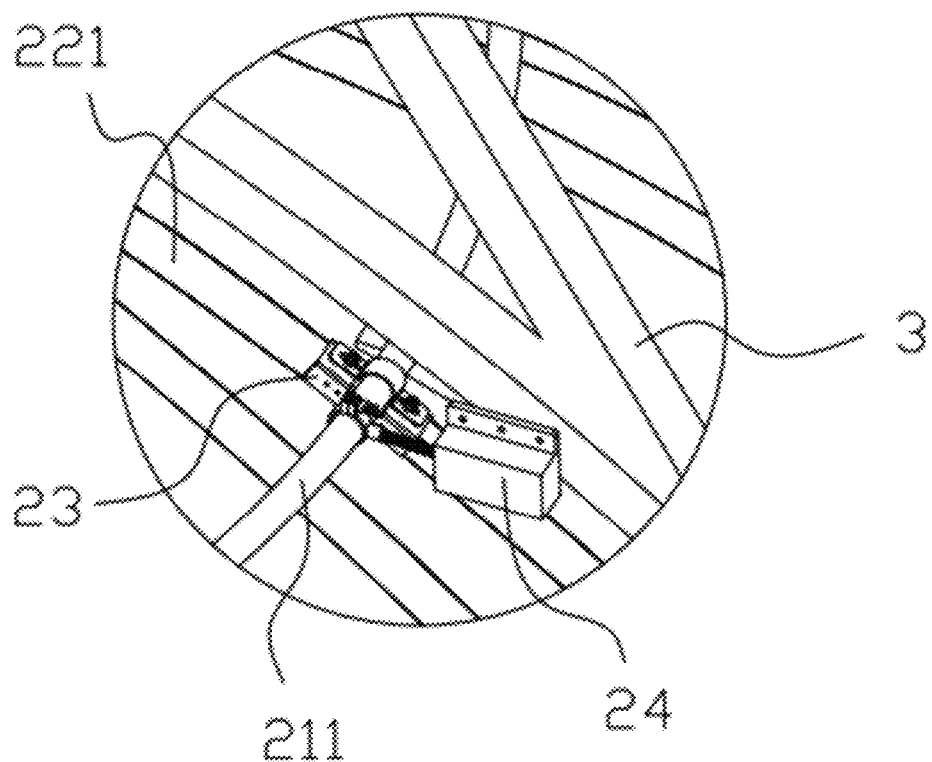
FIG. 17 is a schematic diagram of the installation structure of the double-curved surface frame layer according to an embodiment of the present invention.
Figure 18:
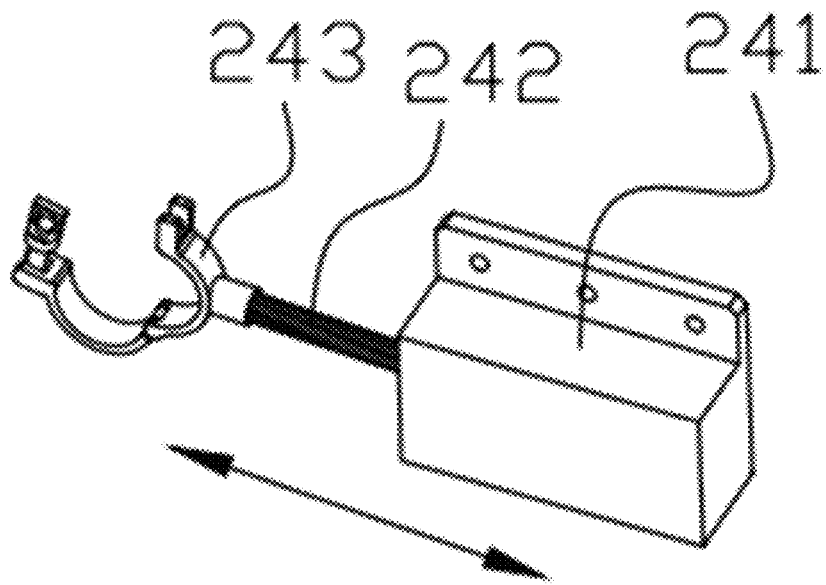
FIG. 18 is a schematic diagram of the structure of the second connecting assembly according to an embodiment of the present invention.

Further, as shown in FIGS. 17 and 18, the main frame layer 3 and the double-curved surface frame layer 2 are connected by the second connecting assembly 24. The second connecting assembly 24 includes the fixing frame 241, the screw rod 242 and the hoop clamp 243. The fixing frame 241 is adjustably fixed on the main frame layer 3, and the screw rod 242 is threaded to the fixing frame 241. The screw rod can extend and retract relative to the fixing frame 241 to adjust the relative position of the double-curved surface structure to the spherical center. The hoop clamp 243 is fixed at the end of the screw rod 242, and the hoop clamp 243 can clamp the transverse curved arc rod 211. In the present embodiment, the hoop clamp 243 is a circular clamp, which can conveniently adjust the transverse curved arc rod 211 in the direction of the latitude line. In addition, the hoop clamp 243 of the present embodiment is devised by combining a hinge with a quick lock. During the connection process, the hinge is pulled, the transverse curved arc rod 211 is put into the hoop clamp 243, and the quick lock quickly locks the hoop clamp 243 to complete the connection.

According to one embodiment of the present invention, as shown in FIG. 19, the panel 121 of the adjustment layer 12 is fixedly connected to the longitudinal curved arc rod 221 by screws.

According to one embodiment of the present invention, the curved display screen supporting framework further includes a bracket, and the bracket is fixedly connected to the bottom end of the main frame layer 3.

The embodiments of the present invention are described above in detail in combination with the drawings, but the present invention is not limited to the above embodiments. Based on the knowledge possessed by those skilled in the art, various changes can also be made without departing from the essence of the present invention.

What is claimed is:

1. A curved display screen forming method, comprising:
   step 1: modeling to obtain a curved virtual display layer, and averagely virtually segmenting the curved virtual display layer in a transverse direction and a longitudinal direction, to obtain a plurality of virtual display modules; calculating a size of each virtual display module of the plurality of virtual display modules;
   step 2: mapping the size of the each virtual display module onto a size of a materialized display module, wherein the size of the each virtual display module corresponds to a planar size of the materialized display module;
   step 3: reducing four edges of the materialized display module, and arranging at least two adjustment protrusions on each edge of the four edges of the materialized display module, wherein an extension distance of the at least two adjustment protrusions is less than half of a reduction distance of the four edges of the materialized display module;
   step 4: constructing a virtual adjustment layer, wherein the adjustment layer comprises a plurality of virtual panels, each virtual panel of the plurality of virtual panels corresponds to a plurality of arrayed virtual display modules, and a size of the each virtual panel is identical with a size of the plurality of arrayed virtual display modules;
   step 5: mapping the size of the plurality of virtual panels onto a size of a materialized panel, wherein the size of the plurality of virtual panels is multiplied by a derivation coefficient of converting a curve to a planar line to obtain a planar size of the materialized panel; and
   step 6: assembling and adjusting the materialized display module and the materialized panel to form a complete curved display screen.

2. The curved display screen forming method of claim 1, wherein, the curved virtual display layer is a spherical screen, a method for calculating the size of the virtual display module in the step 1 comprises:
   defining a plane of a circular cross-section with a diameter D of the spherical screen as an equatorial plane;

averagely and symmetrically segmenting the curved virtual display layer into the plurality of virtual display modules with an isosceles trapezoidal cambered surface in an up and down direction of the equatorial plane;

successively defining the plurality of virtual display modules as a $1^{st}$ virtual display module with a $1^{st}$ isosceles trapezoidal cambered surface, a $2^{nd}$ virtual display module with a $2^{nd}$ isosceles trapezoidal cambered surface, . . . , and an $n^{th}$ virtual display module with an $n^{th}$ isosceles trapezoidal cambered surface above the equatorial plane; the size of the $n^{th}$ virtual display module is calculated as follows:

$$a_n = \frac{l_n}{x}, a_{n+1} = \frac{l_{n+1}}{x}, c_n = \frac{l_l}{y};$$

wherein, $a_n$ is an arc length of a lower base of the $n^{th}$ isosceles trapezoidal cambered surface of the $n^{th}$ virtual display module, $a_{n+1}$ is an arc length of an upper base of the $n^{th}$ isosceles trapezoidal cambered surface of the $n^{th}$ virtual display module, $c_n$ is an arc length of two legs of the $n^{th}$ isosceles trapezoidal cambered surface of the $n^{th}$ virtual display module, $l_n$ is a length of a latitude line of the lower base of the $n^{th}$ isosceles trapezoidal cambered surface of the $n^{th}$ virtual display module, $l_{n+1}$ is a length of a latitude line of the upper base of the $n^{th}$ isosceles trapezoidal cambered surface of the $n^{th}$ virtual display module; r is a number of transverse average segmentation of the spherical screen, y is a number of longitudinal average segmentation of the spherical screen, and $l_1$ is a length of a longitude line of the spherical screen.

3. The curved display screen forming method of claim 1, wherein, in the step 1, the curved virtual display layer is averagely virtually segmented with a fixed angle θ in the transverse direction, and the curved virtual display layer is averagely virtually segmented with a fixed angle λ in the longitudinal direction.

4. The curved display screen forming method of claim 2, wherein, in the step 3, after the materialized display module is obtained, the curved display screen forming method further comprises:

equidistantly reducing the four edges of the materialized display module, wherein the reduction distance of the four edges is s;

arranging the at least two adjustment protrusions on the each edge of the four edges of the materialized display module, wherein the extension distance of the at least two adjustment protrusions is less than s/2.

5. The curved display screen forming method of claim 2, wherein, the each virtual panel is an isosceles trapezoidal cambered surface; a virtual panel corresponds to the plurality of virtual display modules of M*N arrays, wherein M is a number of columns and N is a number of rows; the size of the virtual panel is calculated as follows:

$A_b = M*a_n$, $A_t = M*a_{n+1}$, and $C = N*c_n$;

wherein, $A_b$ is an arc length of a lower base of the virtual panel, $A_t$ is an arc length of an upper base of the virtual panel, and C is an arc length of two legs of the virtual panel.

6. The curved display screen forming method of claim 5, wherein, the arc length of the lower base, the arc length of the upper base and the arc length of the two legs of the virtual panel are multiplied by the derivation coefficient of converting the curve to the planar line to obtain the planar size of the materialized panel, the derivation coefficient is calculated as follows:

$\xi = [(D-\beta)/D]*(H/Lh) + t*\alpha$, wherein, D is the diameter of the spherical screen, β is a rate of change of the spherical screen, H is a height from a center of the spherical screen, Lh is an arc length corresponding to a position of H, t is a thickness of a material of the materialized panel; $\alpha = \Delta L(L*\Delta T)$, wherein, T is an ambient temperature, L is a median line of an isosceles trapezoidal cambered surface of the materialized panel.

7. The curved display screen forming method of claim 6, wherein, after the planar size of the materialized panel are obtained, planar lines of the lower base, the upper base and the two legs of the materialized panel are converted into concave curves; curvatures of the concave curves are equal to curvatures of arcs of the lower base, the upper base and the two legs of the virtual panel respectively corresponding to the planar lines.

8. The curved display screen forming method of claim 2, wherein, in the step 1, the curved virtual display layer is averagely virtually segmented with a fixed angle θ in the transverse direction, and the curved virtual display layer is averagely virtually segmented with a fixed angle λ in the longitudinal direction.

\* \* \* \* \*